Figure 4:
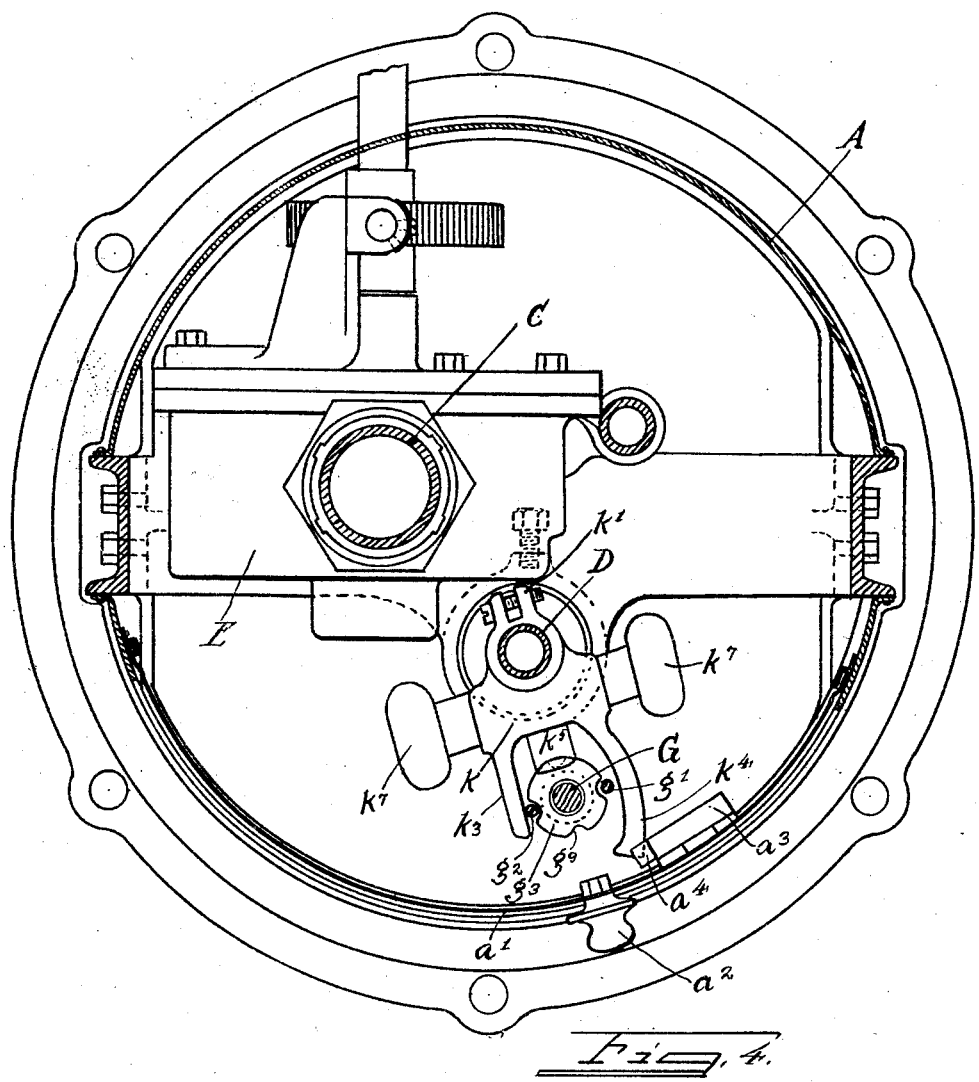

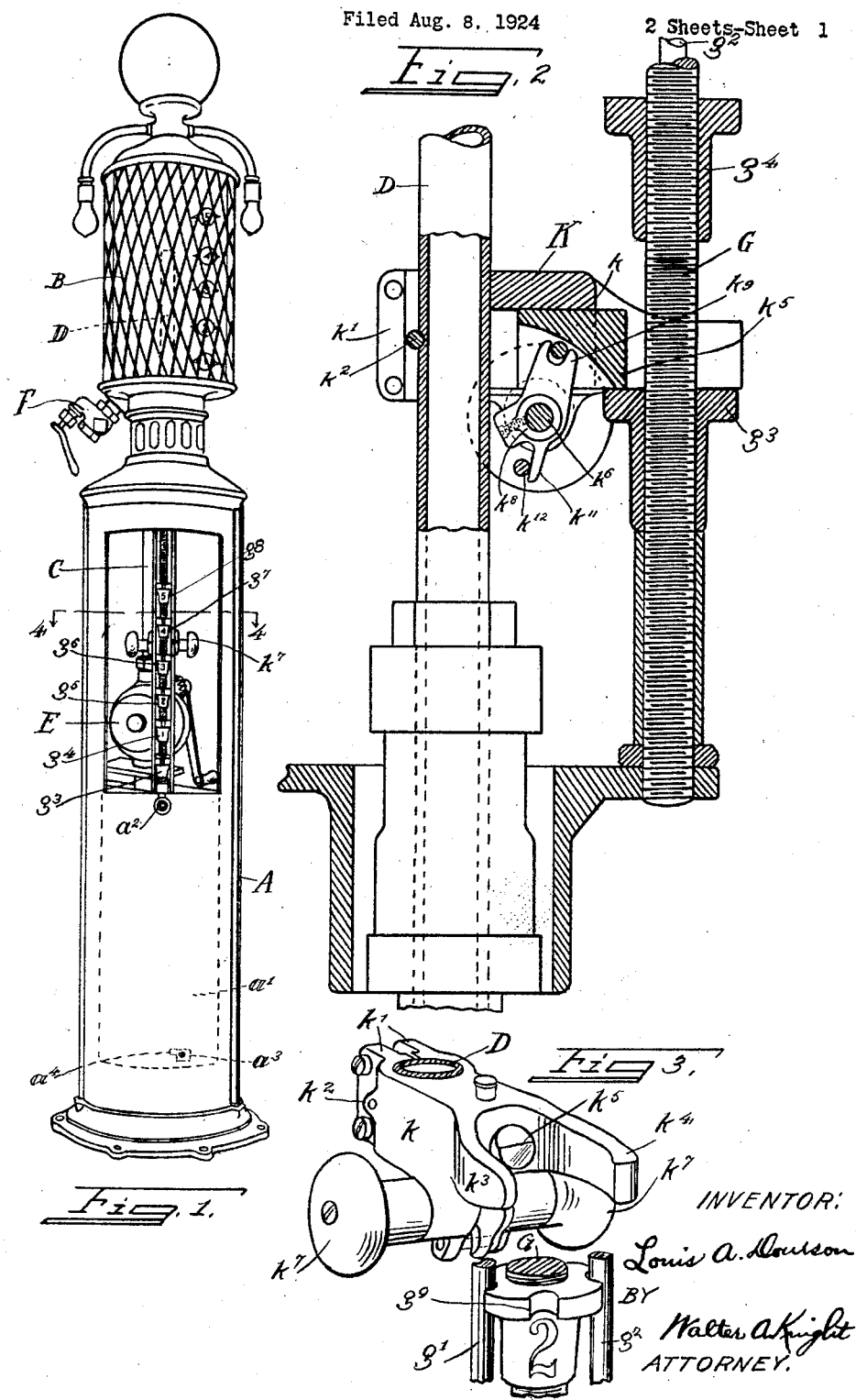

Jan. 24, 1928. 1,657,377
L. A. DOURSON
LIQUID MEASURING AND DISPENSING APPARATUS
Filed Aug. 8, 1924 2 Sheets-Sheet 2

INVENTOR:
Louis A. Dourson.
BY Walter A. Knight.
ATTORNEY.

Patented Jan. 24, 1928.

1,657,377

UNITED STATES PATENT OFFICE.

LOUIS A. DOURSON, OF CINCINNATI, OHIO, ASSIGNOR TO THE AMERICAN OIL PUMP & TANK CO., OF CINCINNATI, OHIO, A CORPORATION OF OHIO.

LIQUID MEASURING AND DISPENSING APPARATUS.

Application filed August 8, 1924. Serial No. 730,850.

My invention relates to liquid measuring and dispensing apparatus of the so-called visible type and particularly to means for adjusting the height within the visible container of a vertical pipe from which the liquid to be dispensed is drained back to the desired level so that when the service valve is opened permitting the dispensing of the contents of the visible container, the exact quantity desired will be in the container ready to be dispensed. This general type of apparatus is in common use for dispensing gasoline at street curbs or filling stations.

The principal object of my invention is to provide an adjustable stop mechanism of a simple, sturdy and convenient type in combination with the over-flow pipe of a visible measuring and dispensing apparatus.

In the particular embodiment of my invention selected for illustration:

Figure 1 is an elevation of a visible measuring and dispensing apparatus having a vertically adjustable overflow pipe and equipped with my improved stop mechanism, Fig. 2 an enlarged detail, is a side view partly in elevation and partly in section of the stop-rod, the adjustable stops thereon and the strike-bolt mechanism, Fig. 3 an enlarged detail is a perspective of the strike-bolt mechanism with the overflow pipe in horizontal section, and a stop with its threaded rod and sealing rods in horizontal section, and Fig. 4 is a cross section on the line 4—4 of Fig. 1.

Referring now to the drawings, A is the housing of a gasoline measuring and dispensing mechanism suitable for out-door use with a vertically sliding door, $a^1$, provided with a handle $a^2$. The housing is surmounted by a cylindrical transparent container B within which terminate the fill-pipe C and the overw-flow pipe D, and the gasoline is dispensed to customers thru the valve controlled outlet F. Liquid is pumped from a source of supply not shown by any pump as E.

The overflow pipe D as shown in Fig. 1, is set to drain back to the source of supply, enough of the gasoline that has been pumped into the container B, so that just four gallons remain therein to be dispensed at that setting.

The pipe B is moved up and down through the usual stuffing boxes by hand by means of handles $k^7$ secured to a strike-bolt mechanism K consisting of a housing $k$, clamped at its rear by clamp $k^1$, reinforced by pin $k^2$, and a forward portion terminating in a fork having preferably a short arm $k^3$, and a long arm $k^4$ from between which may be projected or retracted a strike-bolt $k^5$. When the door $a$ is closed a lock $a^3$ has a bolt $a^4$ adapted to be projected over the end of the long arm $k^4$ and hold said door shut, until unlocked. The bolt $k^5$ is moved in and out by means of a shaft $k^6$ to either end of which is fixed a handle $k^7$ having preferably the general shape of a door knob. To this shaft $k^6$ is fixed a double end lever $k^8$, one end of which has a fork $k^9$ in which is loosely seated a pin $k^{10}$ secured to the bolt $k^5$, so that rotation of the shaft $k^6$ in a clockwise direction (see Fig. 2) moves the bolt outwardly toward the stop-rod G but this outward movement is limited by the other end $k^{11}$ of the lever $k^8$ contacting with the pin $k^{12}$ secured to the housing $k$. Rotation of the shaft $k^6$ in the opposite direction will retract the bolt $k^5$ until it contacts with the overflow pipe D. H is an oil-cup.

Parallel with the overflow pipe D and preferably directly in front of it, is secured the threaded stop-rod G with a plurality of stops threaded thereon adapted to be adjusted as to height by rotation. Each of the stops $g^3$, $g^4$, $g^5$, $g^6$, $g^7$, $g^8$ have vertical grooves $g^9$ thru the periphery, preferably one for each quarter turn, and sealing rods $g^1$, $g^2$ are adapted to seat in them when adjusted and prevent their being rotated out of proper position by accident or the design of malicious or mischievous persons. These rods are removable and may be sealed in position by sealers of weights and measures in the usual way.

When the apparatus is assembled for use the rods $g^1$, $g^2$ and G and the stops on the latter lie between the arms $k^3$ and $k^4$ of the fork and the strike bolt mechanism K and attached overflow pipe D are free to be raised or lowered at will as long as the bolt $k^5$ is retracted. The stop $g^8$ is set for complete draining of the container B, when the strike bolt $k^5$ contacts with and rests on its top, and so limits the descent of the pipe D. Stop $g^4$ is set to retain one gallon for delivery through outlet F, that is the surface of the liquid stands level with the (1) on the container B when the bolt $k^3$ strikes and comes to rest on its top. Stop $g^5$ is set to retain two gallons for delivery thru outlet F, that is the surface of the liquid stands level with the (2) on the container B when the bolt $k^5$ strikes and comes to rest on its top. Stop $g^6$ is set to retain three gallons for delivery through outlet F, that is the surface of the liquid stands level with the (3) on the container B when the bolt $k^5$ strikes and comes to rest on its top. Stop $g^7$ is set to retain four gallons for delivery through outlet F, that is the surface of the liquid stands level with the (4) on the container B, when the bolt $k^5$ strikes and comes to rest on its top. Stop $g^8$ is set to retain five gallons for delivery thru the outlet F, that is the surface of the liquid stands level with the (5) on the container B, when the bolt $k^5$ strikes and comes to rest on its top.

When the tube D is to be raised or lowered the handles $k^7$ are first rotated so as to retract the bolt $k^5$, and then with the bolt in that position the operator lifts on the handles if the tube is to be raised until the desired position, or a little above it is reached, then the handles are rotated so as to push the bolt outwardly, and if the bolt is somewhat above the level of the top of the appropriate stop, the operator pushes down on the handles until the bolt strikes and rests upon the top of said stop. If the tube D is to be lowered, the bolt is retracted, the tube lowered by pressing down on the handles until the bolt has passed the stop above the one to be used, then the bolt is protruded, and the tube further lowered until the bolt strikes and rests upon the top of said stop.

Many variations may be made from the mechanism shown without departing from the spirit of my invention, and all such are claimed as within the scope of the claims.

I claim as my invention and desire to secure by Letters Patent of the United States:

1. Stop mechanism for a liquid measuring and dispensing apparatus, comprising a plurality of separately adjustable stops, a strike-bolt, and combined means for raising and lowering a vertically adjustable overflow pipe, for protruding at will the strike-bolt to cause it to contact with the next lower stop to arrest the downward movement of the pipe, and for retracting the strike-bolt out of contact with all the stops.

2. Stop mechanism for a liquid measuring and dispensing apparatus having a vertically adjustable overflow pipe, comprising a plurality of independent stops threaded to a substantially vertical rod, rod means for locking the stops after adjustment to prevent their being further rotated, a strike-bolt adapted to be moved into and out of contact with the stops, and combined means for raising and lowering the vertically adjustable overflow pipe, for protruding at will the strike-bolt to cause it to contact with the next lower of the stops to arrest the downward movement of the pipe, and for retracting the strike-bolt out of contact with all the stops.

3. Stop mechanism for a liquid measuring and dispensing apparatus having an elevated liquid container and a vertically adjustable pipe through which liquid flows from the container, said mechanism comprising a plurality of independent stops threaded to a substantially vertical rod, sealing rod means for locking the stops to prevent their being rotated after adjustment, combined means including a reciprocable strike-bolt secured to the pipe for raising and lowering the pipe, for throwing at will said strike-bolt into the vertical plane of the stops so as to cause it to contact with the next lower of the stops in any between stops position of the bolt to arrest downward movement of the pipe or for throwing said strike-bolt out of contact with all the stops.

4. In combination with a liquid measuring and dispensing apparatus having an elevated liquid container and a vertically adjustable pipe with its top end terminating within the container; a threaded quantity-stop rod, a plurality of independently rotatable stops mounted on the rod, means for securing the stops against rotation, a substantially horizontal bolt secured to the pipe and adapted to be raised and lowered with it, combined means for raising and lowering the pipe and for protruding the bolt at will at any between stops position of the bolt to cause the bolt to contact with the then next lower stop to prevent further lowering of the pipe and for retracting the bolt out of contact with any of the stops, and a guide adapted to contact with the means for preventing the rotation of the stops for keeping the bolt in vertical alignment with the stops.

5. In combination with a liquid measuring and dispensing apparatus having an elevated liquid container and a vertically adjustable pipe with its top end terminating within the container; a plurality of quantity stops arranged in a vertical row in juxtaposition to the pipe, a substantially horizontal bolt secured to the pipe so as to be raised and lowered with it, the bolt when protruded extending into the vertical plane of the stops, a guide adapted to keep the bolt in alignment with the stops, and combined means for raising and lowering the pipe, for protruding the bolt in any position of the pipe when the bolt is between stops so that upon further lowering of the pipe the bottom of the bolt will collide with the top of the next lower stop and for retracting the bolt.

6. In combination with a liquid measuring and dispensing apparatus having an elevated liquid container and a vertically positioned axially adjustable pipe with its top end terminating within the container; a plurality of quantity-stops arranged in a vertical row in juxtaposition to the pipe, a strike-bolt secured to the pipe and adapted to be raised and lowered with it, the strike-bolt so positioned that the bolt will extend into the vertical plane of the stops when protruded, means for maintaining the bolt in alignment with the row of stops, and combined means for protruding and retracting the bolt and raising and lowering the tube.

7. In combination with a liquid measuring and dispensing apparatus having an elevated liquid container and a vertically positioned axially adjustable pipe with its top end terminating within the container, a threaded quantity-stop rod, a plurality of independently rotatable stops mounted on the rod, a clamp fixed to the pipe so as to be raised and lowered with it, a guide to prevent the pipe and clamp from being rotated, a strike-bolt secured to the clamp and so positioned on it that the bolt will extend into the plane of the stops when protruded and combined means for protruding and retracting the bolt and raising and lowering the tube.

8. In combination with a liquid measuring and dispensing apparatus having an elevated liquid container and a vertically positioned axially adjustable pipe with its top end terminating within the container; a plurality of quantity-stops arranged in a vertical row in juxtaposition to the pipe, a strike-bolt secured to the pipe and adapted to be raised and lowered with it, the strike-bolt so positioned that the bolt will extend into the vertical plane of the stops when protruded, means for maintaining the bolt in alignment with the row of stops, and combined means including a handle on each side of the pipe for protruding and retracting the bolt and raising and lowering the tube.

9. In combination with a liquid measuring and dispensing apparatus having an elevated liquid container and a vertically adjustable overflow pipe with its top end terminating within said container; a threaded quantity-stop rod; a plurality of independently rotatable stops mounted on said rod; means for securing said stops against rotation when adjusted in operating position; a substantially horizontal bolt secured to said overflow pipe and adapted to be raised and lowered with it, means both for protruding said bolt to cause it to contact with the next lower of said stops at will to prevent the pipe being lowered further at that setting and for withdrawing said bolt so that it cannot contact with any of said stops; a guide adapted to make guiding contact with said means for preventing rotation of said stops for keeping said bolt in vertical alignment with said stops; a casing for said apparatus having an opening through which the mechanism can be reached to adjust the overflow pipe, bolt and quantity stops; a door to close said opening; and locking means attached to the door and adapted to coact with said guide and lock the door when the overflow pipe is in its lowest position.

In testimony whereof I have hereunto set my hand.

LOUIS A. DOURSON.